Oct. 22, 1968  M. J. DUNCKER ET AL  3,406,994
APPARATUS FOR MAKING A YARN CONNECTION
Filed June 8, 1967  6 Sheets-Sheet 1

Fig. 2ª.

INVENTORS
MICHIEL JOHANNES DUNCKER &
JACOBUS JOSEPHUS HENRICUS GERARDUS DAAMEN

BY
Stevens, Davis, Miller & Mosher
ATTORNEYS

INVENTORS
MICHIEL JOHANNES DUNCKER &
JACOBUS JOSEPHUS HENRICUS GERARDUS DAAMEN

BY Stevens, Davis, Miller & Mosher
ATTORNEYS

Oct. 22, 1968  M. J. DUNCKER ET AL  3,406,994
APPARATUS FOR MAKING A YARN CONNECTION
Filed June 8, 1967  6 Sheets-Sheet 3

INVENTORS
MICHIEL JOHANNES DUNCKER &
JACOBUS JOSEPHUS HENRICUS GERARDUS DAAMEN

BY
Stevens, Davis, Miller & Mosher
ATTORNEYS

Oct. 22, 1968 M. J. DUNCKER ET AL 3,406,994
APPARATUS FOR MAKING A YARN CONNECTION
Filed June 8, 1967 6 Sheets-Sheet 5

INVENTORS
MICHIEL JOHANNES DUNCKER &
JACOBUS JOSEPHUS HENRICUS GERARDUS DAAMEN

BY
Stevens, Davis, Miller & Mosher
ATTORNEYS

Fig. 9c1 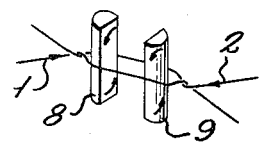

Fig. 9c2 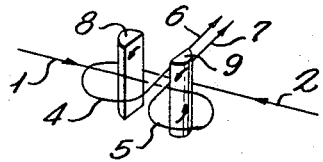

Fig. 10c1 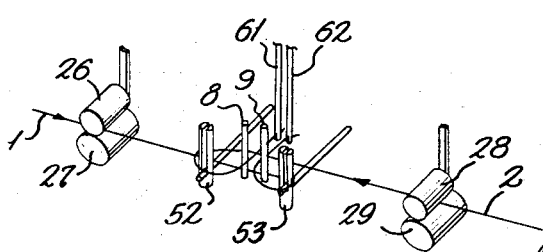
Fig. 10c2 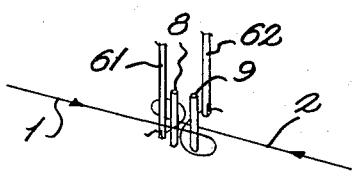

United States Patent Office 3,406,994
Patented Oct. 22, 1968

3,406,994
APPARATUS FOR MAKING A YARN CONNECTION
Michiel J. Duncker and Jacobus J. H. G. Daamen, Arnhem, Netherlands, assignors to Algemene Kunstzijde Unie N.V., Arnhem, Netherlands, a corporation of the Netherlands
Filed June 8, 1967, Ser. No. 644,713
Claims priority, application Netherlands, June 9, 1966, 6608047; Oct. 12, 1966, 6614327
10 Claims. (Cl. 289—2)

ABSTRACT OF THE DISCLOSURE

A knotter for making a yarn connection in which two free yarn ends of two oppositely directed adjacent yarns are passed through a loop formed by the yarns and bounded on each side by a zone wherein the yarns are wound around each other and formed into a yarn connection.

---

This invention relates to an apparatus for making a yarn connection, i.e., a knot, between two free, oppositely directed, yarn ends and more particularly to a knotter for making a knot in which each free yarn end of the two oppositely directed adjacent yarns is passed through a loop formed by the two oppositely directed yarns and bounded on either side by a zone in which the yarns are wound around each other.

A yarn connection similar to the above type is known, in which at the end of each of the zones one of the yarns is wound round the other yarn in the direction of and to a point near the loop formed by the yarns, and is subsequently passed through said loop. This yarn connection is often used for tying together very heavy and smooth yarns. An apparatus for providing such yarn connections is also known.

It has been found that this known yarn connection is suitable for tying together very smooth yarns, but that it has disadvantages in the case of light yarns. These disadvantages consist, inter alia, in that the knot is rather thick, which is due to the fact that in each of the two extreme zones one yarn is wound round itself and the other yarn, and in that there is no suitable apparatus for making such a knot in thin yarns and under economic conditions; since operaiton of the known apparatus requires many manipulations, and its construction is on the whole unsuitable for knotting together thin yarns.

The present invention provides a knotter for making a yarn connection in which these disadvantages are eliminated. The yarn connection produced by the knotter of the invention is absolutely non-slip for smooth yarns, even if the yarns have a low denier, and has a hitherto unknown strength of 95 to 98% of the yarn strength. It has, moreover, been found that the knotter can be operated very simply also by unskilled labor, the skill of the operator having no influence on the quality of the resulting yarn connection.

The present invention thus provides a knotter in which the yarn connection of the type indicated above as known is so modified that in the loop and in the two zones in which the yarns are wound round each other each of the yarns extends substantially in one and the same direction, and from the ends of the two zones the yarns bypass the zones and run back to and are passed through the loop. Although it is in principle possible to pass the yarn ends through the loop in opposite directions, it is preferred to pass them through the loop in one and the same direction. In the two zones each yarn is now only wound round one other yarn, as a result of which the knot obtained is thinner. This improved yarn connection may be made in a very simple manner with the aid of the knotter according to the invention.

More particularly, the knotter of this invention comprises a combination of:

(a) Two parallel pins, which may be moved towards and away from each other, and which may together be rotated on the line connecting their centers;

(b) Two fixed wrapping surfaces, which are mounted substantially parallel to the initial position of the pins and outside the path thereof;

(c) Two yarn clamping means positioned on the extended axis of rotation of the pins, and on either side of the pins;

(d) Two lifting members, which are positioned on either side of the fixed wrapping surfaces, and which are movable in the direction of the free ends of said surfaces;

(e) A third yarn clamping means positioned relative to the pins on the side remote from the wrapping surfaces;

(f) A first cutting means positioned between the pins and the third yarn clamp;

(g) A second cutting means, e.g., a pair of scissors, the blades of which are movable past the lower sides of the two lifting members; and (h) A driving system or means for successively rotating the pins, moving the pins towards each other, simultaneously operating the lifting members and the first cutting means, and operating the second cutting means.

It will be appreciated that the two fixed wrapping surfaces may be mounted on one and the same side of the two pins or on either side thereof. It has been found that the former position, i.e., with both surfaces on the same side, is to be preferred.

With the aid of this apparatus a knot may be made in the following manner.

A first yarn is placed in one of the first two yarns clamping means, mentioned under (c) and is with its free end passed in front of the two pins. The second yarn is successively placed in the other of the first two clamping means, mentioned under (c), passed behind the two pins, wrapped round one of the two fixed wrapping surfaces, passed between the two pins and fixed with its free end in the third yarn clamping means, mentioned under (e). Subsequently the first yarn is wrapped round the other fixed wrapping surface, also passed between the two pins and fixed in the third yarn clamping means. Next, the pins are rotated, as a result of which the yarns form, around said pins, into a loop which connects to two zones which extend to the first two yarn clamping means, mentioned under (c) and in which the two yarns are wound round each other in opposite directions. The free ends of the yarns are now positioned on top of said loop. Subsequently, the pins are moved towards each other so that the free yarn ends are clamped between them, in which position the yarn ends remain when the loop is raised by the two lifting members. When the yarn ends are held between the pins and before the loop is raised, the yarn ends are trimmed by the first cutting means. When the above procedure has been completed, the free yarn ends may be pulled through the loop, as a result of which the knot may, in principle, be given its desired shape. When the knot has been pulled tight, any excessive length of the free yarn ends may be trimmed off.

Pulling the knot tight may be done by hand. It is also contemplated by this invention to have the lifting members raise the knot to such a high level that the knot is pulled tight. However, it has been found that this manner of tightening the knot often makes it difficult to prevent the knot from being tightened asymmetrically.

It is therefore preferred, in some cases, to use an embodiment of the knotter in which the first two yarn clamping means, mentioned under (c) are pairs of nip rollers, which are connected to a mechanism that causes the roller pairs, during the movement of the lifting members, to carry out a forwarding movement in directions away from the pins.

The driving system or means for carrying out the various movements required may be of a varying nature. It is contemplated, for instance, to take the movements from one or more programme-controlled electric or pneumatic power sources. A solution of this type is rather costly and very complicated. This also holds for many other mechanical solutions. It has been found, however, that a very simple mechanical solution may be obtained if, according to the invention, the knotter is a hand-operated apparatus provided with an actuating means including a key which, when pressed, rotates the parallel pins and tensions a spring, and which, when returned to its initial position by the tensioned spring, drives the other movable parts.

By means of a system or means comprised of two ratchet wheels with oppositely directed pawls it is possible with one key (when it is being pressed and when it returns to its initial position) to actuate the different parts. In addition to a construction with two ratchet wheels, there are several other constructions which produce this effect. However, according to the invention one very simple and yet very effective solution can be obtained if the key forms one arm of a lever, the other arm of which is formed by a toothed sector. The toothed sector engages a first gear having a shaft supported in slotted holes which extend parallel to the circumference of the toothed sector, and in which the shaft may have a free stroke between two extreme positions. In these positions, the gear is in contact with, respectively, a system of gears driving the pins, and a second gear driving the other movable parts. According to the invention the members mentioned above under sections (c) to (g) inclusive, may take their movement from the second gear, in that the second gear is coupled with a system of non-round disks and cams which are coupled, with the above-mentioned members, to be driven thereby.

Threading of the above-described apparatus, which precedes the formation of the knot is, however, somewhat complicated and time-consuming. Making a yarn connection therefore often requires considerable care by the operators. It has been found, moreover, that the above-described apparatus can be further improved to be used as automatic knotters in fully mechanical textile machines.

Thus, this invention also contemplates an embodiment of the apparatus which is particularly suitable for such fully mechanised machines.

This further embodiment is characterized in that positioned on that side of the line connecting the two first yarn clamping means which is nearest to the wrapping surfaces is at least a fourth (and in some cases a fifth) yarn clamping means which also serve as cutting means, and in that furthermore the third yarn clamping means also provides a pulling mechanism which can be moved from the fourth (and fifth) yarn clamping means between the parallel pins (or the extensions thereof) towards the side of the wrapping surfaces that are remote from the pins.

This further embodiment makes it possible with a simple movement to place each of the yarns directly in its desired position. With the first-described embodiment of the apparatus it is necessary to pass the first yarn through part of the apparatus, and then to pass the second yarn through the apparatus along a rather complicated path, and finally to pass the first yarn through the rest of the apparatus, also along a complicated path. With this further embodiment of the apparatus, however, each of the yarns may be passed through with one simple movement.

The further embodiment of apparatus is threaded with the first yarn by passing it with its free end, for instance, from the left in front of the two pins, and by fixing it with its free end in the fourth yarn clamping means. Subsequently the second yarn is threaded by passing it from the right behind the two pins and fixing it in the fifth yarn clamping means. A simpler apparatus, threading of which is hardly more complicated, is obtained when the fourth and fifth yarn clamping means are formed by one and the same yarn clamping means, in which both yarns are fixed. In that case this combined yarn clamping means should be positioned symmetrically relative to the pins and on the same side of the pins as the fixed wrapping surfaces.

Moreover, whereas with the first-mentioned embodiment of apparatus the two yarns are manually passed between the pins, namely the first yarn after the second yarn, with this further embodiment this operation can be omitted because it is carried out by the pulling mechanism provided by the third clamping means. In this regard, this pulling mechanism is either passed between the parallel pins or is positioned over the pins and at such a short distance therefrom that the yarns are located between the pins. By so constructing the fourth yarn clamping means and, if present, the fifth yarn clamping means, that they also serve as cutting means, e.g., scissors, the yarns passed through the apparatus may, before the knot is made, be trimmed to the desired length. As a result, the knot will always be made using two yarn ends of precisely constant length.

The further improved embodiment of the apparatus also differs from the first embodiment in that the two first yarn clamping means are not closed immediately after the yarns have been passed through. With the further embodiment, the yarn clamping means are not closed before the apparatus begins making the knot. In this way it is ensured that the yarn ends, when they are pulled through the loop, are still sufficiently long to prevent the yarn from being subject to too high a tension.

It should be added that the apparatus according to the invention may also be constructed so that the fourth and fifth yarn clamping means are combined into one and also form part of the pulling mechanism. In that case the yarns, when they are passed through the apparatus, are directly clamped in the pulling mechanism.

It will then be necessary to provide, on either side of the point where the yarns are clamped, a cutting means such as a pair of scissors which, when the pulling mechanism is in its initial position, trim the yarns to the desired length.

It is also contemplated to close the first two yarn clamping means and to move the pulling mechanism with the aid of independent driving systems or means. However, from a constructional point of view it has been found possible, and even advantageous, to construct the apparatus so that the driving system or means which affects all the other movements of the apparatus also closes the first two yarn clamping means before the pins are rotated, and moves the pulling mechanism into its final position before the pins are moved towards each other.

The way in which the knot is formed by the further embodiment of the apparatus is quite similar to that outlined above for the first embodiment, namely by having, according to the invention, a driving system or means actuating the pulling mechanism before the pins are rotated. In that case the two yarns are already passed between the two parallel pins before the formation of the two zones in which the yarns are wound round each other.

It has been found, however, that it is also quite possible, to construct the knotter according to the invention so that the driving system means does not acuate the pulling mechanism before the pins have been rotated. In this case the yarns are first wound round each other in the zones on either side of the loop formed by the two yarns, and only then are the free ends of the two yarns passed between the parallel pins and positioned on top of said loop. Both constructions of the apparatus can be satisfactorily obtained.

Depending upon whether the fourth and fifth yarn clamping means are present separately or whether they are combined into one means, it will be necessary to use different constructions of the pulling mechanism. The simplest construction of the pulling mechanism is obtained if the fourth and fifth yarn clamping means are combined into one. In that case the two yarns, when they have been passed through the apparatus, are adjacent to each other, so that they can be gripped by the pulling mechanism in a simple way. Also, with this arrangement it is preferred to use a construction, according to the invention, in which the third clamping means, which also serves as the pulling mechanism, is adapted to carry out a swinging movement and a translating movement, the swinging movement being coupled to the closing movement of the first two clamping means and being continued until the pulling mechanism faces the fourth yarn clamping means. Passing the yarns through the apparatus will not be hindered by the pulling mechanism, because it is then swung out of the way. Once the two yarns have been passed through, the yarns are gripped by the pulling mechanism, which is swung into its appropriate position, and later the yarns are passed between the parallel pins by the translating movement of the pulling mechanism. Once the two yarns are in this position, they are clamped between the closing parallel pins which, subsequently, pull the yarns through the loop formed.

The invention will now be further described with reference to the accompanying drawings, in which FIGURE 1 shows a completed knot prior to being pulled tight;

FIGURES 2a to 2g, inclusive, show different stages in the formation of the knot in the knotter apparatus of the invention;

FIGURE 3 shows a detail of the knot forming mechanism of the apparatus;

FIGURE 4 schematically shows the position of the mechanism shown in FIGURE 4 in the knotter;

Figure 7A:
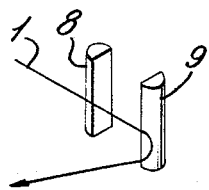
Figure 7B:
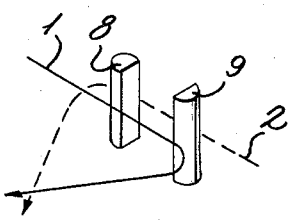
Figure 7B:
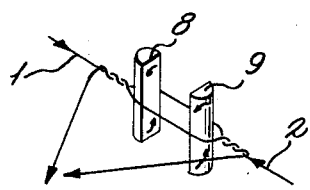
Figure 7B:
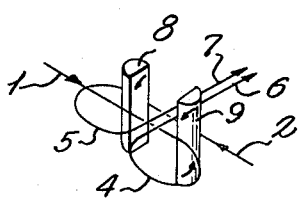
Figure 8A:
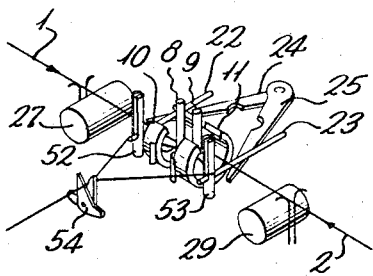
Figure 8B:
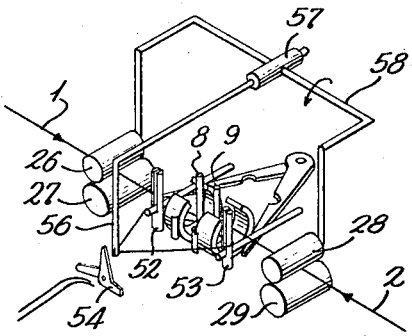
Figure 8D:
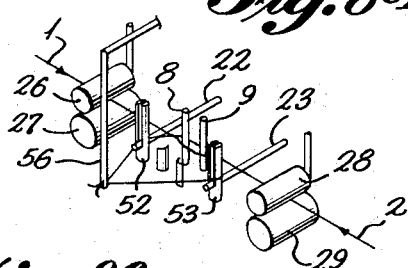
Figure 8D:
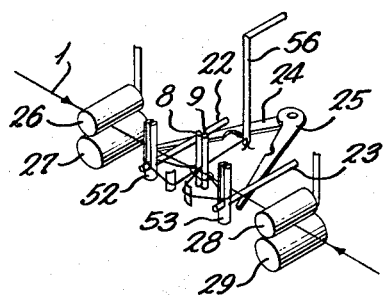
Figure 9A:
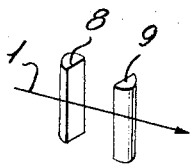
Figure 9B:
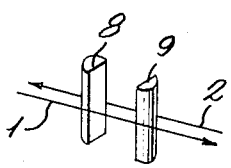
Figure 9D:
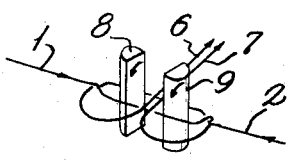
Figure 10A:
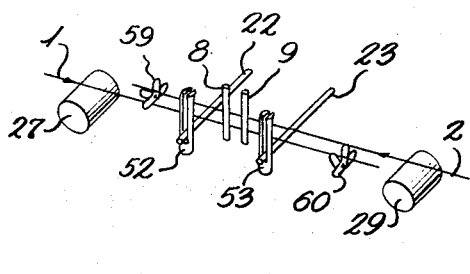
Figure 10B:
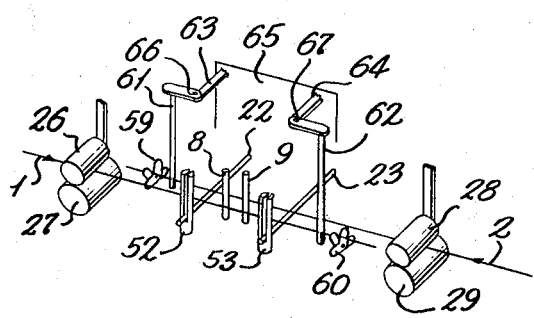

FIGURES 7a to 7d, inclusive, show modified stages which may be used in the formation of the knot in the apparatus of the invention;

FIGURES 8a to 8f, inclusive, show the essential elements of one embodiment of the invention in successive positions required for the formation of the knot;

FIGURES 9a to 9d, inclusive, show stages alternative to those shown in FIGURES 7a to 7b, inclusive, for forming the knot; and FIGURES 10a to 10c, inclusive, show alternative constructions of the apparatus shown in FIGURES 8a to 8c, inclusive.

Figure 1:
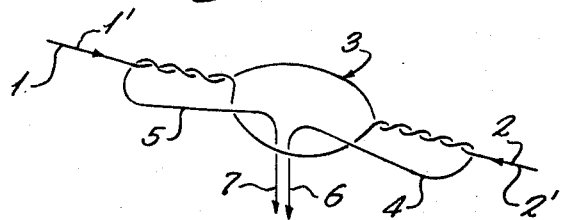

In FIGURE 1 the reference numerals 1 and 2 designate two yarns formed into a knot according to the invention, the knot being shown prior to being pulled tight. As can be seen, the two yarns form a loop 3, which is enclosed between two zones in which the yarns are wound round each other. At the ends of said zones the yarns are guided back, while forming loops 4 and 5, and passed with their free ends 6 and 7 through the loop 3. The knot is completed by pulling the ends of the yarns 1' and 2', respectively.

Figure 2B:
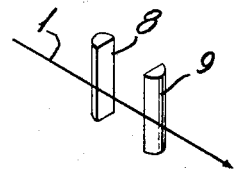
Figure 2B:
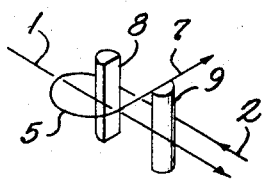
Figure 2C:
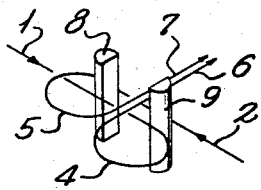

FIGURE 2a shows two pins 8 and 9 which have facing gripping surfaces, With the first-described embodiment of the knotter the yarn 1 is laid, first from left to right, in front of the pins 8 and 9 (see FIGURE 2a). Subsequently, the yarn 2 is manually laid behind the pins 8 and 9 and passed around the pin 8, a loop 5 being formed (see FIGURE 2b). Next, the yarn 1 is passed, by way of a loop 4, in front of the pin 9 and between the pins 8 and 9 (see FIGURE 2c). The free ends 6 and 7 thus come to be over the loop 3 formed by the yarns 1 and 2.

Figure 2D:
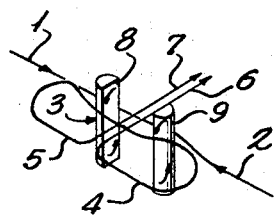
Figure 2E:
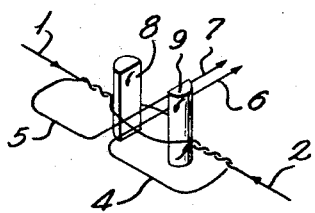
Figure 2F:
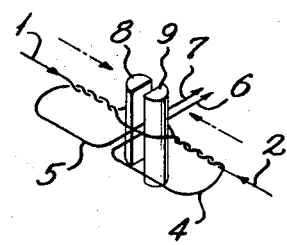
Figure 2G:
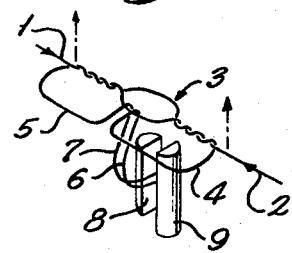

The knot is completed by the knotter mechanically. To this end, first the pins 8 and 9 are rotated anti-clockwise, i.e., in the direction of the arrows (see FIGURE 2d). During this movement the loop 3 is retained and the yarn ends 6 and 7 remain positioned over the loop. As a result the yarns are wound round each other in the zones on either side of the loop 3 (see FIGURE 2e). The pins 8 and 9 are then moved towards each other so that the ends 6 and 7 of the yarns 1 and 2 are held between them (see FIGURE 2f), the loops 3, 4 and 5 of the yarns are then raised, the ends 6 and 7 being pulled through the loop 3. The yarns 1 and 2 have now been formed into the knot shown in FIGURE 1. The knot is completed by trimming off the ends 6 and 7 and pulling the yarn ends or portions 1' and 2', extending towards the zones on either side of the loop 3.

Figure 3:
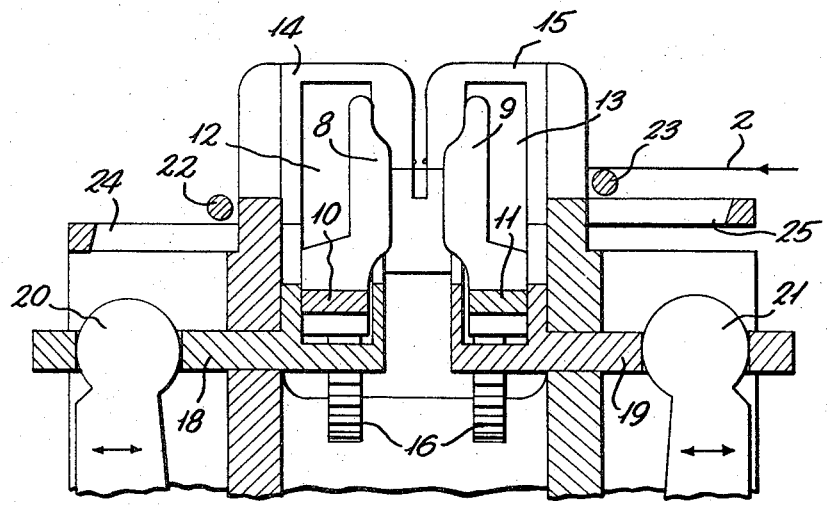

FIGURE 3 is a detailed view of the construction of one embodiment of the knot forming mechanism at the two pins 8 and 9. (The relative position of this detailed view is further shown by the dash lines on FIGURE 6. The two pins form part of two gears 10 and 11, respectively. The gear 10 is provided with a recess 12, which extends from one side of the gear to near the opposite side thereof, and which is wider than the pin 8. Similarly, the gear 11 is provided with a recess 13, which also extends from one side of the gear 11 to near the opposite side thereof. The pin 9 is located within recess 13, with some space being provided on either side of the pin. The gears 10 and 11 are tightly enclosed in cages 14 and 15 which make it unnecessary for the gears to be supported by shafts. From the upper portions downwards the cages 14 and 15 are each provided with recesses which, in the vertical position of the pins 8 and 9, are in line with the recesses 12 and 13 in the gears 10 and 11. As a result, the yarns 1 and 2 may be laid from outside the cages into the apparatus, respectively in front of and behind the pins 8 and 9 in the manner heretofore described with reference to the FIGURES 2a to 2f, inclusive.

Figure 5:
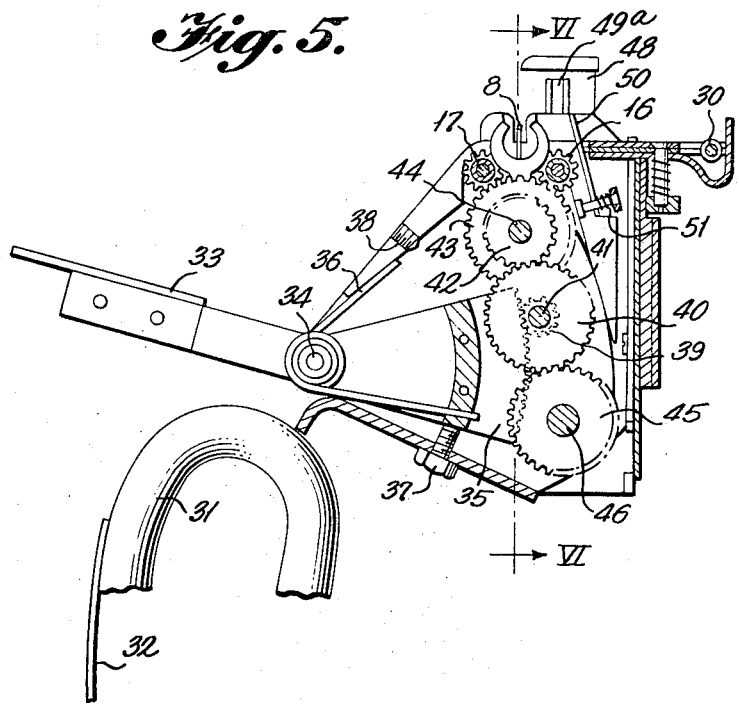
FIGURE 5 shows one embodiment of the driving mechanism for the knotter.

The gears 10 and 11 are driven and kept, in their positions, against the interior of the cages 14 and 15 by two gear pairs. FIGURE 3 only shows gear pair 16. As shown in FIGURE 5, the gear pair 17 is positioned in front of pair 16. By means of the gear pairs 16 and 17 the gears 10 and 11, and hence the pins 8 and 9, can be rotated. This movement is the rotary movement of the pins 8 and 9 heretofore described with reference to FIGURE 2e.

The movements of the pins 8 and 9 towards each other and away from each other, as described above with reference to FIGURE 2f, may be effected by moving dish-shaped elements 18 and 19 towards and away from each other, respectively. To this end, these elements are coupled with levers 20 and 21. A movement of the levers 20 and 21 will result in displacement of the pins 8 and 9 relative to each other.

The displacement of the knot being formed towards and beyond the top ends of the pins 8 and 9, as described above with reference to FIGURE 2f, is effected with the aid of lifting members 22 and 23 shown in FIGURE 3. These members may be raised along the outside walls of the cages 14 and 15, in order to then push the overlying yarns in upward direction. Positioned immediately under the lifting members are two blades 24 and 25 of a pair of scissors which are part of the second cutting means heretofore described. When the knot being formed has been raised far enough and has subsequently been pulled tight, the blades move towards each other and trim off the free yarn ends 6 and 7 at a point about 1 millimeter below the tightened knot.

Figure 4:
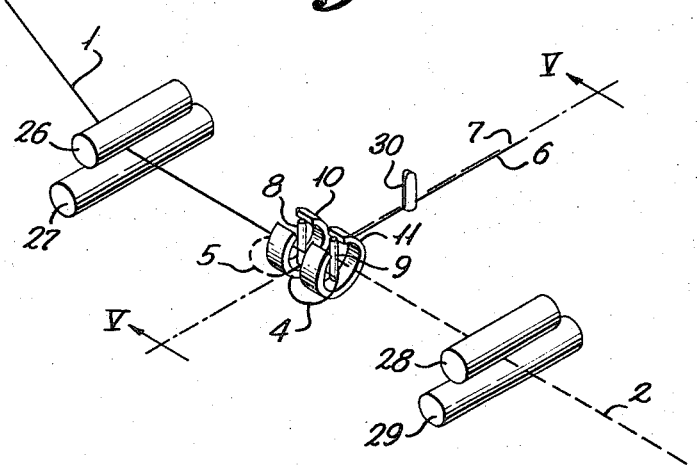

FIGURE 4 schematically shows the relative position of the above-described knotting mechanism in the knotter. As can be seen, the yarns 1 and 2 are passed to the pins 8 and 9 in the direction of the axis on which the pins 8 and 9 and the gears 10 and 11 rotate. The yarns are kept in this path by two yarn clamping means in the form of a roller pair 26, 27 and a roller pair 28, 29. When the yarns 1 and 2 are being laid in the way shown in FIGURE 4, the rollers are tightly closed, and when the knot is to be pulled tight they may be rotated. During the formation of the knot the free yarn ends 6 and 7 are held in a schematically indicated yarn clamping means 30. FIGURE 4 shows the paths of the two loops 4 and 5 along which the yarns 1 and 2 are passed round two wrapping surfaces in the knotter. The projections providing these fixed wrapping surfaces are not shown in FIGURE 4, but it will be understood that the projections are arranged so surfaces actually extend vertically and that they each have a free top end. As a result, when the knot being formed is raised, it may readily slip off the wrapping surfaces.

Figure 6:
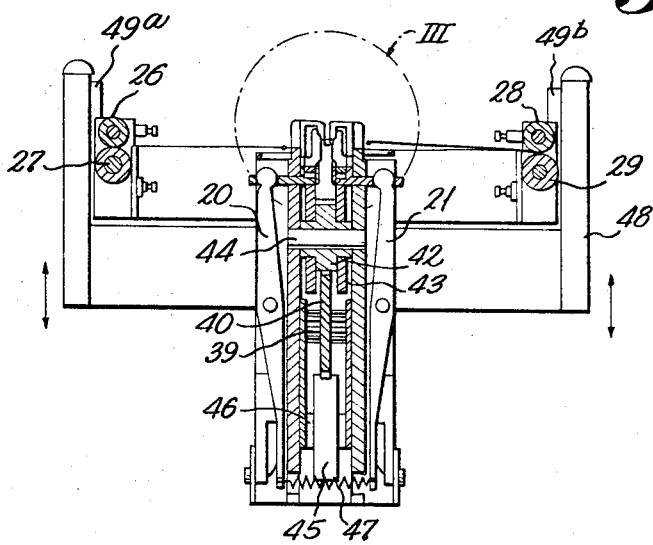
FIGURE 6 shows the apparatus taken along the line VI—VI in FIGURE 5.

FIGURE 5 shows an embodiment of the knotter in section taken along line V—V in FIGURE 4. FIGURE 6 shows the same apparatus in section taken along line VI—VI in FIGURE 5. As heretofore noted, the detail view encircled in FIGURE 6 and indicated by III is shown on an enlarged scale in FIGURE 3. This embodiment of the apparatus will be further described with reference to the combination of FIGURES 5 and 6.

The reference numeral 31 refers to a handle, which may be fastened to the hand of the operator with a belt 32. If the apparatus is held in the hand in this way, the operator's thumb may easily press a key 33 to the right about a fulcrum 34. The key forms an arm of a lever, the other arm of which is formed by a toothed sector 35. When the key 33 is pressed to the right, the toothed sector 35 will move to the left and take with it one end of a wire spring wound round the shaft 34. As a result, the wire spring 36 is tensioned. By means of two set screws 37 and 38 the stroke of the key 33, and hence the stroke of the toothed sector 35, may be fixed between two limits.

The toothed sector 35 engages with a small gear 39, which is mounted on the same shaft with a larger gear 40. The common shaft of these two gears is supported in two slotted holes in the frame of the apparatus. These holes are not shown in the drawings, but are so shaped that the shaft 41 can only be moved in a direction transverse to its axis of rotation in such a way that the distance between the shafts 34 and 41 remains constant.

In the extreme left position of the shaft 41 (see FIGURE 5) the gear 40 engages with a gear 42. Mounted on the shaft 44 of this gear and on either side thereof are two gears 43 (see FIGURE 6). These gears 43 drive the gear pair 16 shown in FIGURE 3, as well as the gear pair 17 (shown in FIGURE 5).

When the key 33 is released, the toothed sector 35 will be driven back under the influence of the tensioned wire spring 36. As a result, the shaft 41 of the gear 39 will be forced away from the shaft 44, until the gear 40 engages with a gear 45. The gear 45 will then be roated on its shaft 46. From the rotary movement of shaft 46 all the other above-described functions of the apparatus are taken. To this end various non-round disks and cams are mounted on the shaft 46. The transmissions required for driving the various mechanisms are not all shown in detail, but to one skilled in the art such arrangements are obvious from the construction of the apparatus.

The following description may serve to further illustrate this operation. The back ends of the levers 20 and 21 are pressed apart by a spring 47, and it will be clear that these lever arms may be moved towards each other by suitably formed, axial surfaces on the shaft 46 (not shown).

Also resulting from the movement of the shaft 46 is a reciprocating, longitudinal movement of a yoke 48. This yoke is provided with two racks 49a and 49b. Each of these racks engages with gears attached to the shafts of the rollers 27 and 29, respectively. Consequently, the longitudinal movement of the yoke 48 leads to a rotary movement of the roller pairs 26, 27 and 28, 29, which, as described above, results in the knot being tightened. Also resulting from the rotary movement of the shaft 46 are the movements of the lifting members 22 and 23 and of the scissor blades 24 and 25 as heretofore described.

In FIGURE 5 the reference numeral 50 designates one of the two blades of a pair of scissors, which is referred to as the first cutting means. These blades may turn on a pin 51. The scissors formed by these two blades cut the thread ends 6 and 7 at a point between the pair of pins 8, 9 and the yarn clamping means 30, that is, shortly before the lifting members 22 and 23 begin to lift the knot off the pins 8 and 9. As a result, only short parts of the free yarn ends 6 and 7 must be pulled through the loop 3. The movement of these scissors is also taken from the rotary movement of the shaft 46.

It should be added that all the above-described movements of the functional parts may, of course, be affected differently from the above-described way, in which they are taken from the shaft 46. However, the above-described construction has the advantage of being very simple.

The operation of this embodiment of the apparatus may further be illustrated by the following specifications. In order that the pins 8 and 9 may carry out three revolutions, the key 33 must be turned through 25°12' and in order to have the gear 40 engage with the gear 42 the key requires an additional free stroke of 80'. This free stroke displaces the key 33 but not before it is released and the gear 40 can engage with the gear 45. From this point on, the pins 8 and 9 are closed after 1°3' movement, the scissors 50 begin to trim off the free yarn ends after 2°52' movement, and the lifting members 22 and 23 begin to raise the knot over a distance of 12 millimeters after 3°9' movement, as a result of which the knot is also tightened. Subsequently, the scissors 24, 25 trim off the clamped yarn ends to lengths of 1 millimeter, then during the rest of the stroke of the key 33, all the moving parts are returned to their initial positions.

When the pins have opened again, the yarn lengths that were clamped between them may be removed in a simple manner, for instance, by a blowing, sucking, brushing, shaking or the like action.

The FIGURES 7a to 7d, inclusive, show some successive stages in the procedure for knotting together the yarns, as it is carried out in one further embodiment of the knotter according to the invention. FIGURE 7a shows how the yarn 1 is passed first in front of and then away from the two pins 8 and 9. Subsequently, the yarn 2 is, as can be seen from FIGURE 7b, passed behind the pins 8 and 9, and bent to the same point in front of the pins 8 and 9 as the yarn 1. At the point where the yarns 1 and 2 cross each other they are together fixed in a clamping means which may also be constructed as a cutting means, i.e., a pair of scissors. Up to this point the yarns are passed through the apparatus by hand. The knot is further formed in a fully mechanical manner. As can be seen from FIGURE $7c_1$, the pins 8 and 9 are now rotated in a way similar to that shown in FIGURE 2d. As a result, two zones are formed in which the yarns are wound round each other. The yarns 1 and 2 are mechanically gripped at the point where they cross each other, and passed between the pins 8 and 9 in the way shown in FIGURE 7d. The resulting situation is then the same as that shown in FIGURE 2e. The way in which the knot is further formed is substantially identical with that in which this is done in the first-described embodiment of the knotter.

Figure 7D:
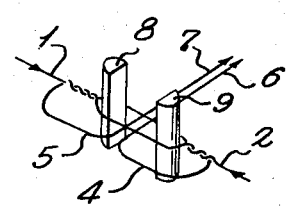

FIGURE $7c_2$ schematically shows an alternative to the above-indicated procedure. This figure shows how first the yarns, after they have been manually passed through the apparatus in the way indicated in FIGURE 7b, are mechanically gripped and passed between the pins 8 and 9, after which the pins 8 and 9 are rotated, as a result of which the situation will be the same as shown in FIGURE 7d.

FIGURE 8a schematically shows some of the essential elements of the improved embodiment of the knotter according to the invention and is a view taken from the same direction as FIGURE 3. However, the rollers 27 and 29 are now placed closer together, and the fixed wrapping surfaces that were (in the first-described embodiment of the apparatus) described to be blunt projections are now provided by split pins 52 and 53. Through the slits in pins 52 and 53 the lifting members 22 and 23 may be raised when the ends 6 and 7 of the yarns are to be pulled through the loop 3. The scissor blades 24 and 25 were also present in the afore-described apparatus, but the member 54 has been added. This member consists of a pair of scissors, between the blades of which, when opened, the yarns 1 and 2 may be laid and lightly clamped. It should be noted, however, that this clamping action is not essential. When this apparatus is in its initial position and the yarns have been passed through as shown in FIGURE 7b and FIGURE 8a, the rollers 26 and 28 (see FIGURE 4) are swung upwards. When the yarns 1 and 2 have been passed through in the manner shown in FIGURE 8a, the knotter is started. The support 58, on which the rollers 26 and 28 are mounted, turns downwards in the direction of the arrow. As a result, these rollers come to rest on the rollers 27 and 29, so that the yarns 1 and 2 are held between them (see FIGURE 8b). During the movement of the support 58 a guide bushing 57 is revolved. As a result, a hook-shaped clamp 56 which is slidably fixed within the bushing moves downwards and grips the yarns just in front of the blades of the scissors 54. Simultaneously therewith the scissors 54 cut off the excess lengths of the yarns 1 and 2.

As can be seen from FIGURE 8c₂, the hook-shaped clamp 56 is subsequently moved backwards through the guide bushing 57, the yarns being pulled between the pins 8 and 9. When the apparatus is in this position, the pins 8 and 9 are rotated (see FIGURE 8d), after which the lifting members 22 and 23 are raised (see FIGURE 8e). When the lifting members 22 and 23 are being raised, the members move through the slits in the wrapping surfaces provided by pins 52 and 53; the formed knot being tightened. Together with the lifting members 22 and 23 the scissor blades 24 and 25 are raised. The moment when the knot has been tightened, the scissor blades 24 and 25 close and trim off the excess lengths of the yarns.

In order that the hook-shaped clamp 56 may be prevented from hindering the cutting movement of the scissor blades 24 and 25, these blades are provided with recesses which may accommodate the hook-shaped clamp 56, so that the scissor blades may be closed freely. It should be added that there are, of course, different possible constructions to prevent the hook-shaped clamp from hindering the scissor blades 24 and 25 in their movement.

With the present embodiment of the apparatus the wrapping surfaces 52 and 53 are longer than with the first-described embodiment apparatus. Also the length of the upward stroke of the lifting members 22 and 23 has been increased. As a result of the above modifications the rollers 26 to 29, inclusive, need not be rotated to tighten the knot. Moreover, these rollers can be disposed closer together. As a result, the apparatus has a more compact construction.

Figure 8F:
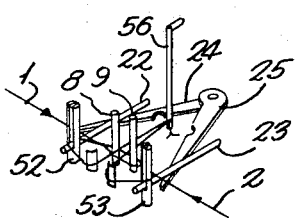
Figure 8F:
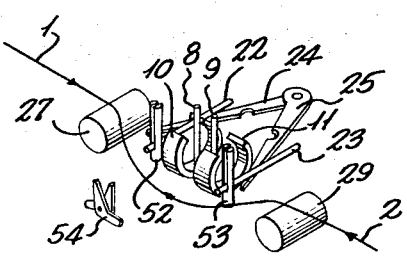
Figure 8E:
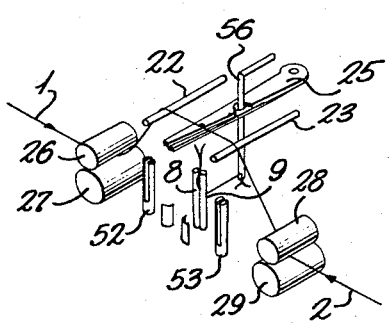

The last movement of the apparatus is shown in FIGURE 8f. The rollers 26 and 28 are swung upwards together with the hook-shaped clamp 56, which slips to the front again through the guide 57; the scissor blades 24 and 25 are opened and are lowered together with the lifting members 22 and 23. Moreover, the scissors 54 are opened again. The formed knot now lies with some slack in the apparatus, and may simply be removed therefrom.

FIGURE 8c₁ represents, in principle, an alternative construction of the apparatus. The figure shows the alternative procedure of forming the knot as shown in FIGURE 7c₂. When the hook-shaped yarn clamp 56 has gripped the yarns, the pins 8 and 9 are rotated, and only then is the yarn clamp passed between the pins 8 and 9. Subsequently, the pins 8 and 9 are moved towards each other so that the yarns are held between them (see FIGURE 5d), after which the knot may be tightened and raised.

A quite different procedure for forming the knot with the apparatus of this invention is shown in principle in the FIGURES 9a to 9d, inclusive. The yarn 1 is, here again, passed in front of the pins 8 and 9, but need not now be bent to the front. Also the yarn 2 is passed along a straight path behind the pins 8 and 9. These two operations are schematically shown in the FIGURES 9a and 9b. It is only these two operations that are carried out by hand. The remaining steps for forming the knot are carried out mechanically.

FIGURES 9c₁ and 9c₂ show two alternative movements of the yarns which can be mechanically effected by the knotter. As can be seen, it is again possible first to rotate the pins 8 and 9 and subsequently to pass the yarns between them or first to pass the yarns between the pins and subsequently to rotate them. In both cases the situation will eventually be as shown in FIGURE 9d and correspond to those represented by FIGURES 7d and 2e.

The FIGURES 10a to 10c, inclusive, generally indicate how the above procedure can be realized mechanically by the apparatus of this invention. As can be seen from FIGURE 10a, the construction of the apparatus is in principle, essentially the same as that shown in FIGURE 8a. Instead of one cutting means, i.e., the pair of scissors 54, which serves to cut both yarns 1 and 2, two cutting means, i.e., scissors 59 and 60 are provided. This arrangement makes it possible for the yarns 1 and 2 to be passed through the apparatus along straight paths. Comparison of the FIGURES 10b and 8b reveals that also in this case the first mechanical operation of the apparatus consists in swinging down the rollers 26 and 28 combined with trimming off the excess lengths of the yarns (by the scissors 59 and 60), when the yarns have been gripped by the clamping means in the form of the hook-shaped clamps 61 and 62. The function of the hook-shaped clamps 61 and 62 corresponds to that of the hook-shaped clamp 56 in FIGURE 8b. The clamps 61 and 62 are, via supports 63 and 64, attached to a back plate 65. The upper rollers 26 and 28 are also attached to plate 65. The clamps 61 and 62 are hingedly attached to the supports 63 and 64, the clamps being adapted to turn on the hinge pins 66 and 67. FIGURES 10c₁ and 10c₂ show two alternative constructions in which the two hook-shaped clamps 61 and 62 turn on the hinge pins 66 and 67 and are passed between the pins 8 and 9 either in the same direction or in opposite directions. When these movements have been completed, the pins may, in the usual way, be rotated, moved towards each other, etc. The further formation of the knot is carried out in the manner described in the above-described apparatus. Of course, it is also conceivable first to rotate the pins 8 and 9 and then to pass the hook-shaped clamps 61 and 62 between them.

The further embodiments of the apparatus have been found very suitable for quickly making a knot, and are, moreover, compact and easy to operate. Threading the apparatus, as far as this has been described above as being carried out by hand, may with the improved embodiments of the knotter be mechanized in a simple manner. However, in that case it is necessary to use threading devices, which do not form part of the knotter per se. It will thus be appreciated that many embodiments of the knotter of this invention are very suitable to be incorporated in fully automatic winders.

While the novel features of the invention have been shown and described and are pointed out in the appended claims, it is to be understood that various omissions, substitutions and changes in construction and arrangement of the features shown and described may be made by those skilled in the art without departing from the spirit and scope of the invention.

What is claimed is:

1. A knotter for making a yarn connection in which two free yarn ends of two oppositely directed adjacent yarns are passed through a loop formed by the yarns and bounded on each side by a zone wherein the yarns are wound around each other, said knotter comprising, in combination, two parallel pins, which may be moved towards and away from each other, and which may together be rotated on the line connecting their centers; two members providing fixed wrapping surfaces, which are mounted substantially parallel to the initial position of the pins and outside the path thereof; two yarn clamping means, positioned on the extended axis of rotation of the pins, and on either side of the pins; two lifting members, which are positioned on either side of the fixed wrapping surfaces, and which are movable in the direction of the free ends of said surfaces; a third yarn clamping means, positioned relative to the pins on the side remote from the wrapping surfaces; a first cutting means positioned between the pins and the third yarn clamping means; a second cutting means movable adjacent the lower sides of the two lifting members; and a driving means for successively rotating the pins, moving the pins towards each other, simultaneously operating the lifting members and the first cutting means, and operating the second cutting means, whereby upon being threaded-in said oppositely directed yarns are formed into said yarn connection.

2. The knotter of claim 1, in which the first two yarn clamping means comprise pairs of nip rollers, which are connected to a mechanism that is powered by said driving means, and that causes the roller pairs, during the movement of the lifting members, to carry out a forwarding movement in directions away from the pins, whereby said yarn connection is pulled tight.

3. The knotter of claim 1, in which said driving means includes a hand-operated key which, when pressed by the operator, rotates the parallel pins and tensions a spring, and which, when returned to its initial position by the tensioned spring, drives the other movable parts of the knotter.

4. The knotter of claim 3, in which the key forms one arm of a lever, the other arm of which is formed by a toothed sector; said toothed sector engaging a first gear having a shaft which is supported in slotted holes that extend parallel to the circumference of the toothed sector, and in which said shaft may have a free stroke between two extreme positions; said first gear being in contact with a system of gears driving the pins in one of said extreme positions, and in contact with a second gear driving the other movable parts of the knotter, when in the other of said extreme positions.

5. The knotter of claim 4, in which the second gear is coupled with a system of cam means, each of which is coupled with one of the parts actuated during the return of said key to its initial position by said tensioned spring.

6. The knotter of claim 1, which further comprises at least a fourth yarn clamping means positioned on that side of the line connecting the two first yarn clamping means which is nearest to said two wrapping surfaces, said fourth clamping means also providing a cutting means for said yarns, and said third yarn clamping means further providing a pulling mechanism which can be moved from the fourth yarn clamping means between the parallel pins towards the side of the wrapping surfaces that is remote from the pins.

7. The knotter of claim 6, in which said driving means closes the first two yarn clamping means before rotating the pins, and also moves the pulling mechanism into its final position before said pins are moved towards each other.

8. The knotter of claim 7, in which the driving means actuates the pulling mechanism before the pins are rotated.

9. The knotter of claim 7, in which the driving means actuates the pulling mechanism after the pins have been rotated.

10. The knotter of claim 7, in which said third yarn clamping means is adapted to carry out a swinging movement and a translating movement, said swinging movement being coupled to the closing movement of the first two clamping means and being continued until the pulling mechanism faces the fourth yarn clamping means.

References Cited

UNITED STATES PATENTS

| 2,264,784 | 12/1941 | Abbott | 289—2 |
| 3,028,185 | 4/1962 | Messa | 289—2 |
| 3,298,726 | 1/1967 | Francis | 289—2 |

LOUIS K. RIMRODT, *Primary Examiner.*